H. S. PIERCE.
LUBRICATING WHEEL FOR CHAIN DRIVES.
APPLICATION FILED JAN. 10, 1913.
1,186,434.
Patented June 6, 1916.
2 SHEETS—SHEET 1.
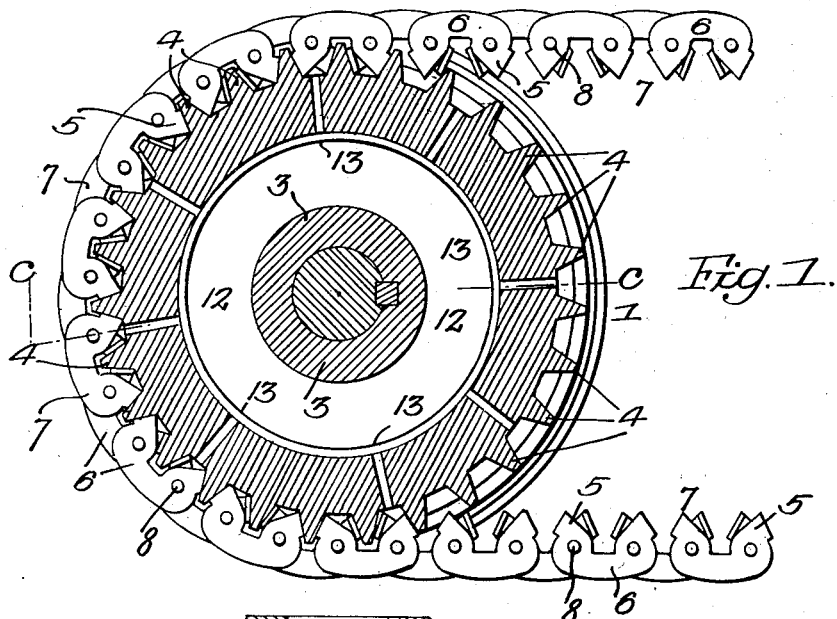
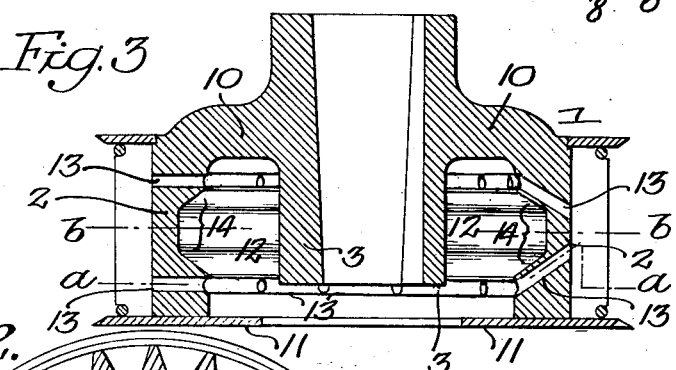
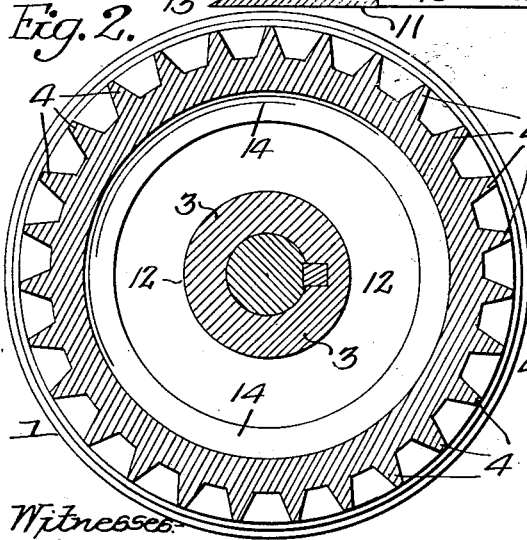
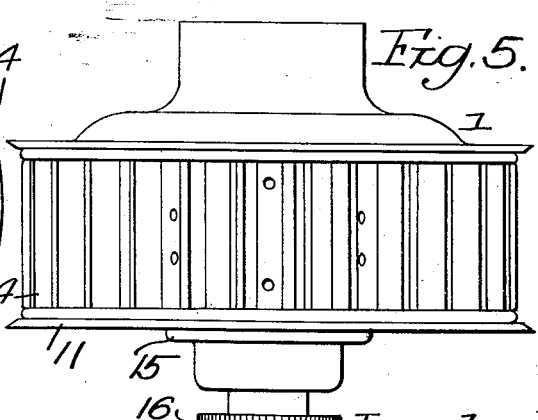
Inventor
Harold S. Pierce.
by his Attorneys.
Towson & Towson
Witnesses
William T. Nax
Willa A. Burrows H. S. PIERCE.
LUBRICATING WHEEL FOR CHAIN DRIVES.
APPLICATION FILED JAN. 10, 1913.
1,186,434.
Patented June 6, 1916.
2 SHEETS—SHEET 2.
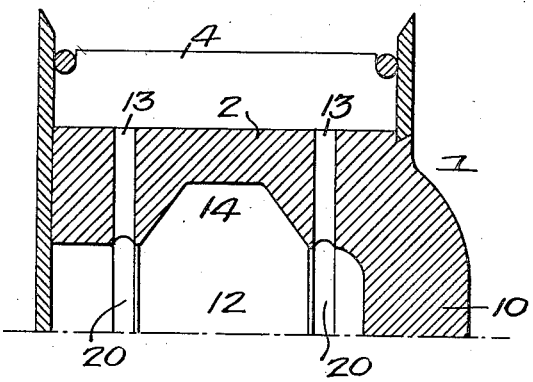
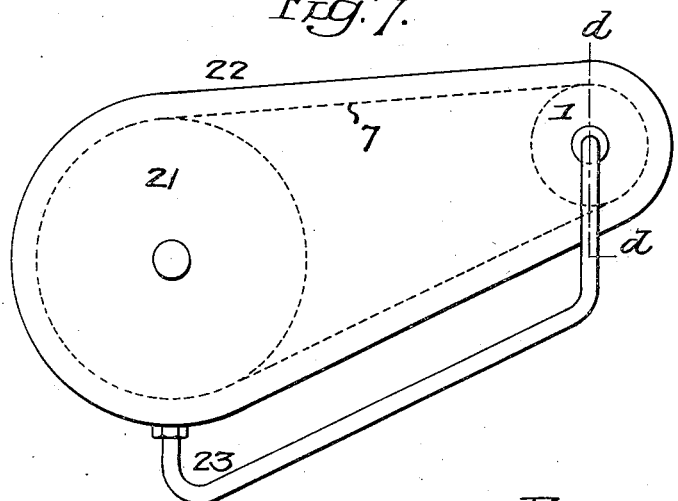
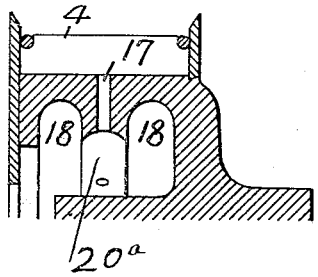
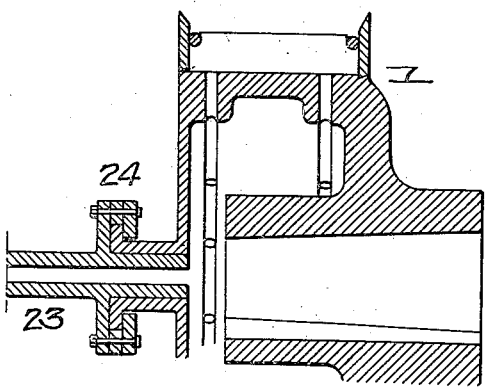
Witnesses—
William F. Noss
Willet Burrowes
Inventor—
Harold S. Pierce.
by his Attorneys
Howson & Howson

UNITED STATES PATENT OFFICE.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

LUBRICATING-WHEEL FOR CHAIN-DRIVES.

1,186,434. Specification of Letters Patent. Patented June 6, 1916.

Application filed January 10, 1913. Serial No. 741,277.

*To all whom it may concern:*

Be it known that I, HAROLD S. PIERCE, a citizen of the United States, residing in Philadelphia, Pennsylvania, have invented certain Improvements in Lubricating-Wheels for Chain-Drives, of which the following is a specification.

My invention relates to certain improvements in sprocket or other wheels used in connection with chain belting, particularly of the type made of plates connected together by pins.

The invention is especially adapted for use in connection with that type of plate chain having projecting teeth which engage the teeth of a sprocket wheel.

The object of the invention is to construct the wheel, around which the chain passes, so as to allow for the proper lubrication of the chain while it is passing around the wheel. This object I attain in the following manner, reference being had to the accompanying drawings, in which:—

Figure 1 is a sectional view of my improved sprocket wheel on the line $a$—$a$, Fig. 3, showing the chain in place; Fig. 2 is a sectional view on the line $b$—$b$, Fig. 3; Fig. 3 is a sectional view on the line $c$—$c$, Fig. 1; Fig. 4 is an enlarged view of a portion of Fig. 3; Fig. 5 is a view illustrating my improved sprocket wheel arranged to use heavy grease as the lubricant; Fig. 6 is a sectional view illustrating a modification; Fig. 7 is a view showing the device applied to a circulating system; and Fig. 8 is a sectional view on the line $d$—$d$, Fig. 7.

Referring to the drawings, 1 is the sprocket wheel having a rim 2 and a hub 3.

4 are the teeth which are shaped to engage the teeth 5 of the plates 6 composing the chain 7. The several plates 6 are connected together and to the plates of an adjoining link by pivot pins 8 and it is important that the pivot pin and the surface of the adjoining plates be lubricated in the proper manner. This cannot be done by applying the lubricant to the back of the teeth, but should be done when the teeth are in the position which they assume in passing around the sprocket wheel shown in Fig. 1. By my invention I apply lubricant to the space between the teeth while the chain is passing around the sprocket wheel.

In the present instance, the web 10 connecting the rim 2 to the hub 3 of the wheel is solid and is arranged at one side of the wheel. On the opposite side of the wheel is a flange 11 which extends to a point near the hub 3; the hub being less in length than the flange in the present instance. By this construction a cavity 12 is formed between the hub and the rim and in this cavity I preferably insert wool, or other waste, which can be impregnated with a lubricant inserted through the space between the hub and the flange 11.

20 are two annular grooves, one on each side of an annular channel or well 14 and 13 are perforations which extend through the rim 2, from the annular grooves to the space between the teeth 4, as shown in Figs. 1, 3, and 4. The annular well 14 allows a certain amount of lubricant to remain in the cavity 12, while portions of the lubricant will flow through the perforations 13. By this construction the wheel can be charged with lubricating material which will escape with less rapidity than if the well or recess were not formed in the flange. Furthermore, by having the open space between the flange and the hub of the wheel, lubricant can be applied to the cavity 12 while the wheel is in motion.

In some instances, as shown in Fig. 5, I may close the cavity by a cap 15 having a screw plug 16; the cavity being charged with grease and the plug inserted and used as a medium for forcing the lubricant through the perforations in the flange of the wheel.

Thus it will be seen by my improvement that I can apply the lubricant directly to the part of the chain, which is ordinarily inaccessible, by perforating the rim of the wheel so that the perforations will communicate with the space between the teeth of the wheel and the lubricant will pass through the perforations and on to the chain at the proper point.

While my invention is particularly adapted for lubricating chains of the type described, it may be used with advantage for lubricating gearing. One of the gears may be made in accordance with my invention, while the other may be made solid.

While I have shown in Fig. 3 a single well with perforations on each side thereof, in Fig. 6 I have illustrated a wheel having a row of central perforations 17 and two annular wells 18, one on each side of the perforations. There may be as many perforations in the wheel as desired and they may be at any angle desired. As shown in Fig. 3, some of the perforations are parallel and communicate with the spaces between the teeth at each side of the wheel, while others are arranged, one at an angle to the other, so as to communicate with the space between the teeth of the wheel near the center of the wheel. I preferably form an annular groove 20ᵃ in the inner wall of the flange at the point where the perforations communicate with the reservoir, as clearly shown in Fig. 6, so that the oil, as it is projected by centrifugal force, will accumulate in the groove and will more readily flow through the perforations.

It will be understood that my invention is particularly adapted for use in connection with intermittent moving machinery, or machinery which is stopped and started even at long intervals, as the centrifugal force will tend to force the oil or other lubricant into the well 14 and into the grooves 20 communicating with the perforations, and the oil will remain in the well, which is practically a reservoir, until the machinery is stopped, when the waste will again take up the oil so that when the machine is started again part of the oil will once more accumulate in the well, while part will pass through the perforations to the periphery of the wheel.

As shown in Figs. 7 and 8, my invention can be used in connection with high speed drives. The two sprocket wheels 1 and 21 and the drive chain 7 are inclosed within a casing 22 and I connect a pipe 23 to the bottom of the casing and extend it to a point opposite the small sprocket wheel 1 and couple it to the sprocket wheel by a stuffing box 24, Fig. 8, so as to communicate with the interior of the sprocket wheel which is made in accordance with Fig. 1 of the drawings. As the sprocket wheel rapidly rotates, it creates a suction in the pipe; drawing oil from the bottom of the casing and discharging it through the openings in the rim of the wheel directly into the joints of the chain, and as the oil is thrown off of the chain, it accumulates in the bottom of the casing to be again circulated. Thus the chain is kept continuously lubricated.

I claim:

1. A sprocket wheel having a hub and a wide rim and having teeth on the periphery of the rim, the hub and rim forming a reservoir for lubricant, the rim having an annular well therein communicating with the reservoir and having a series of passages extending from the spaces between certain of the teeth and at a point at one side of the well, the well being of such a volume that it will retain sufficient lubricant so that, when the wheel is stopped, the lubricant will accumulate in the bottom of the reservoir at a sufficient depth to allow the lubricant to flow over the walls of the reservoir and into the passages so that, when the wheel is again started in motion, the portion of the lubricant formerly in the well will be projected through the passages.

2. A sprocket wheel having a hub and a rim and having teeth on the periphery of the rim, said rim having an annular well formed in its inner surface and having passages on each side of the well but not directly communicating therewith, said passages terminating in the spaces between certain of the teeth, the wheel having a solid web connecting the rim and the hub at one side, the other side of the wheel having a flange terminating short of the hub to allow for the insertion of a lubricant into the space between the rim and the hub.

3. A sprocket wheel having a hub and a rim and also having an internal reservoir located between the hub and the rim and having an annular well formed in the inner surface of the rim and communicating with the reservoir, the rim also having an annular groove located at one side of the well and less in depth than the well, the rim having passages extending from the groove to the spaces between certain of the teeth.

4. The combination of a sprocket wheel having a hub, a rim and a space between the two forming a reservoir, the rim having passages therein connecting with the reservoir; a casing inclosing the wheel; a drive chain passing around said wheel; and a pipe leading from the bottom of the casing to the reservoir in said wheel so that, as the wheel rotates, oil will be drawn from the bottom of the casing through the pipe into the reservoir in the wheel and through the passages in the wheel to the chain.

In testimony whereof, I have signed my name to this specification, in the presence of two subscribing witnesses.

HAROLD S. PIERCE.

Witnesses:
Jos. H. Klein,
Wm. A. Barr.